US012609570B2

(12) United States Patent
Suzuki et al.

(10) Patent No.: US 12,609,570 B2
(45) Date of Patent: Apr. 21, 2026

(54) STATOR WITH FLAT ANGLE COILS WITH VARYING WIDTH AND TEETH HAVING WIDENED PORTIONS

(71) Applicant: IHI Corporation, Koto-ku (JP)

(72) Inventors: Fuminori Suzuki, Koto-ku (JP); Takehiro Jikumaru, Koto-ku (JP); Koji Yamaguchi, Koto-ku (JP); Yosuke Akamatsu, Koto-ku (JP); Masatsugu Takemoto, Sapporo (JP); Sho Manabe, Sapporo (JP)

(73) Assignee: IHI Corporation, Koto-ku (JP)

( * ) Notice: Subject to any disclaimer, the term of this patent is extended or adjusted under 35 U.S.C. 154(b) by 373 days.

(21) Appl. No.: 18/042,952

(22) PCT Filed: Aug. 27, 2020

(86) PCT No.: PCT/JP2020/032460

§ 371 (c)(1),
(2) Date: Feb. 24, 2023

(87) PCT Pub. No.: WO2022/044223

PCT Pub. Date: Mar. 3, 2022

(65) Prior Publication Data

US 2023/0238845 A1     Jul. 27, 2023

(51) Int. Cl.
*H02K 3/18*     (2006.01)
*H02K 1/14*     (2006.01)
*H02K 9/22*     (2006.01)

(52) U.S. Cl.
CPC .............. *H02K 3/18* (2013.01); *H02K 1/148* (2013.01); *H02K 9/225* (2021.01)

(58) Field of Classification Search
CPC .......... H02K 1/148; H02K 1/16; H02K 1/165; H02K 2213/03
(Continued)

(56) References Cited

U.S. PATENT DOCUMENTS 2,169,100 A * 8/1939 Lange .................... H02K 1/148
                                                    310/216.099
4,829,206 A * 5/1989 Honshima .............. H02K 3/493
                                                    29/598
(Continued)

FOREIGN PATENT DOCUMENTS

JP       62-77050 A      4/1987
JP       62-203527 A     9/1987
(Continued)

OTHER PUBLICATIONS

International Search Report issued Oct. 13, 2020 in PCT/2020/032460, filed on Aug. 27, 2020, 2 pages.

*Primary Examiner* — Maged M Almawri
(74) *Attorney, Agent, or Firm* — Oblon, McClelland, Maier & Neustadt, L.L.P.

(57)     ABSTRACT

A stator includes a stator core having a plurality of slots opening toward an inner surface and a plurality of teeth formed between the slots adjacent to each other; and flat angle coils wound around the teeth respectively. Each of the teeth includes a widened portion having a width in a circumferential direction of the inner surface, closer to the inner surface and the widened portion becomes wider, in a cross-sectional view taken along a cross section perpendicular to a rotational axis of a rotor surrounded by the stator core.

6 Claims, 9 Drawing Sheets

(58) Field of Classification Search
USPC .............................. 310/216.009, 69, 216.071
See application file for complete search history.

(56) References Cited

U.S. PATENT DOCUMENTS

| | | | | |
|---|---|---|---|---|
| 6,218,758 | B1* | 4/2001 | Miura ...................... | H02K 3/18 310/216.071 |
| 6,369,483 | B1* | 4/2002 | Hill ...................... | H02K 15/095 310/429 |
| 8,008,832 | B2* | 8/2011 | Rhode ................... | H02K 3/522 310/216.058 |
| 8,250,734 | B2* | 8/2012 | Fubuki ................ | H02K 15/066 29/598 |
| 2002/0057032 | A1* | 5/2002 | Thiele ................... | H02K 1/148 310/216.135 |
| 2003/0006663 | A1* | 1/2003 | Hsu ........................ | H02K 1/148 310/194 |
| 2003/0214197 | A1* | 11/2003 | De Luca ................ | H02K 1/148 310/216.084 |
| 2004/0007933 | A1* | 1/2004 | Hsu ........................ | H02K 1/146 310/194 |
| 2004/0021393 | A1* | 2/2004 | Suzuki ................... | H02K 1/148 310/216.012 |
| 2004/0189137 | A1* | 9/2004 | Hashimoto ............ | H02K 29/03 310/402 |
| 2005/0057106 | A1 | 3/2005 | Allen et al. | |
| 2005/0108870 | A1* | 5/2005 | Harada ............. | H02K 15/0414 29/606 |
| 2005/0242670 | A1* | 11/2005 | Lee ........................ | H02K 3/522 310/43 |
| 2006/0279160 | A1* | 12/2006 | Yoshinaga ............. | H02K 1/148 310/216.049 |
| 2007/0182270 | A1* | 8/2007 | Chuang ................. | H02K 29/03 310/216.058 |
| 2008/0061653 | A1* | 3/2008 | Sagara ................... | H02K 1/148 310/254.1 |
| 2008/0191576 | A1* | 8/2008 | Miyashita .............. | H02K 3/522 310/194 |
| 2010/0107401 | A1* | 5/2010 | Suzuki ................... | H02K 3/522 29/596 |
| 2011/0037339 | A1* | 2/2011 | Rahman ................. | H02K 29/03 703/7 |
| 2013/0106232 | A1* | 5/2013 | Kobayashi ........... | H02K 15/095 310/208 |
| 2013/0169106 | A1* | 7/2013 | Yokogawa ............. | H02K 1/148 310/216.111 |
| 2014/0077655 | A1* | 3/2014 | Yamagishi ............. | H02K 1/148 310/208 |
| 2018/0226845 | A1* | 8/2018 | Chan ...................... | H02K 1/148 |
| 2018/0248419 | A1* | 8/2018 | Nigo ........................ | H02K 1/02 |
| 2020/0144875 | A1 | 5/2020 | Umeda | |
| 2020/0185993 | A1* | 6/2020 | Hoerz ...................... | H02K 1/20 |
| 2021/0091610 | A1* | 3/2021 | Walter ................... | H02K 1/148 |
| 2021/0344246 | A1 | 11/2021 | Ukaji et al. | |

FOREIGN PATENT DOCUMENTS

| | | |
|---|---|---|
| JP | 2000-078779 A | 3/2000 |
| JP | 2001-502880 A | 2/2001 |
| JP | 2005-160143 A | 6/2005 |
| JP | 2006-014530 A | 1/2006 |
| JP | 2006-166610 A | 6/2006 |
| JP | 2007-028777 A | 2/2007 |
| JP | 2010-213508 A | 9/2010 |
| JP | 2014-057441 A | 3/2014 |
| JP | 2015-12763 A | 1/2015 |
| JP | 2017-169310 A | 9/2017 |
| JP | 2020-521421 A | 7/2020 |
| WO | WO 2008/044703 A1 | 4/2008 |
| WO | WO 2010/013444 A1 | 2/2010 |
| WO | WO 2018/211096 A1 | 11/2018 |
| WO | WO 2020/080481 A1 | 4/2020 |

* cited by examiner

STATOR WITH FLAT ANGLE COILS WITH VARYING WIDTH AND TEETH HAVING WIDENED PORTIONS

TECHNICAL FIELD

The present disclosure relates to a stator.

BACKGROUND ART

Patent Document 1 discloses a stator as an example of an armature of an electric motor. The stator disclosed in Patent Document 1 includes a stator core having a plurality of slots opened in an inner surface and a plurality of teeth formed between adjacent slots, and a coil wound around each of the teeth and having a circular cross section.

CITATION LIST

Patent Literature

Patent Literature 1: Japanese Unexamined Patent Publication No. S62-203527

SUMMARY

The electric motor is required to have a small size and a large output. Therefore, it is important to increase the energy efficiency of the electric motor. As one of techniques for improving the energy efficiency of an electric motor, it has been conventionally known to improve the space factor of a coil. In general, the space factor is improved by configuring a coil using a flat angle coil having a rectangular cross section. However, in an electric motor using a flat angle coil, since the surface area of the flat angle coil is large, an eddy current is generated when a magnetic flux from a permanent magnet or the like reaches the flat angle coil when a rotor rotates. As a result, loss of the eddy current increases, and energy efficiency of the electric motor may decrease.

Accordingly, the present disclosure describes providing a stator capable of reducing eddy current loss generated in a flat angle coil.

A stator according to one aspect of the present disclosure includes: a stator core having a plurality of slots opening toward an inner surface and a plurality of teeth formed between the slots adjacent to each other; and flat angle coils wound around the teeth respectively. Each of the teeth includes a widened portion having a width in a circumferential direction of the inner surface, closer to the inner surface and the widened portion becomes wider, in a cross-sectional view taken along a cross section perpendicular to a rotational axis of a rotor surrounded by the stator core.

According to the stator of one aspect of the present disclosure, an eddy current loss generated in a flat angle coil can be reduced.

DESCRIPTION

Figure 1:
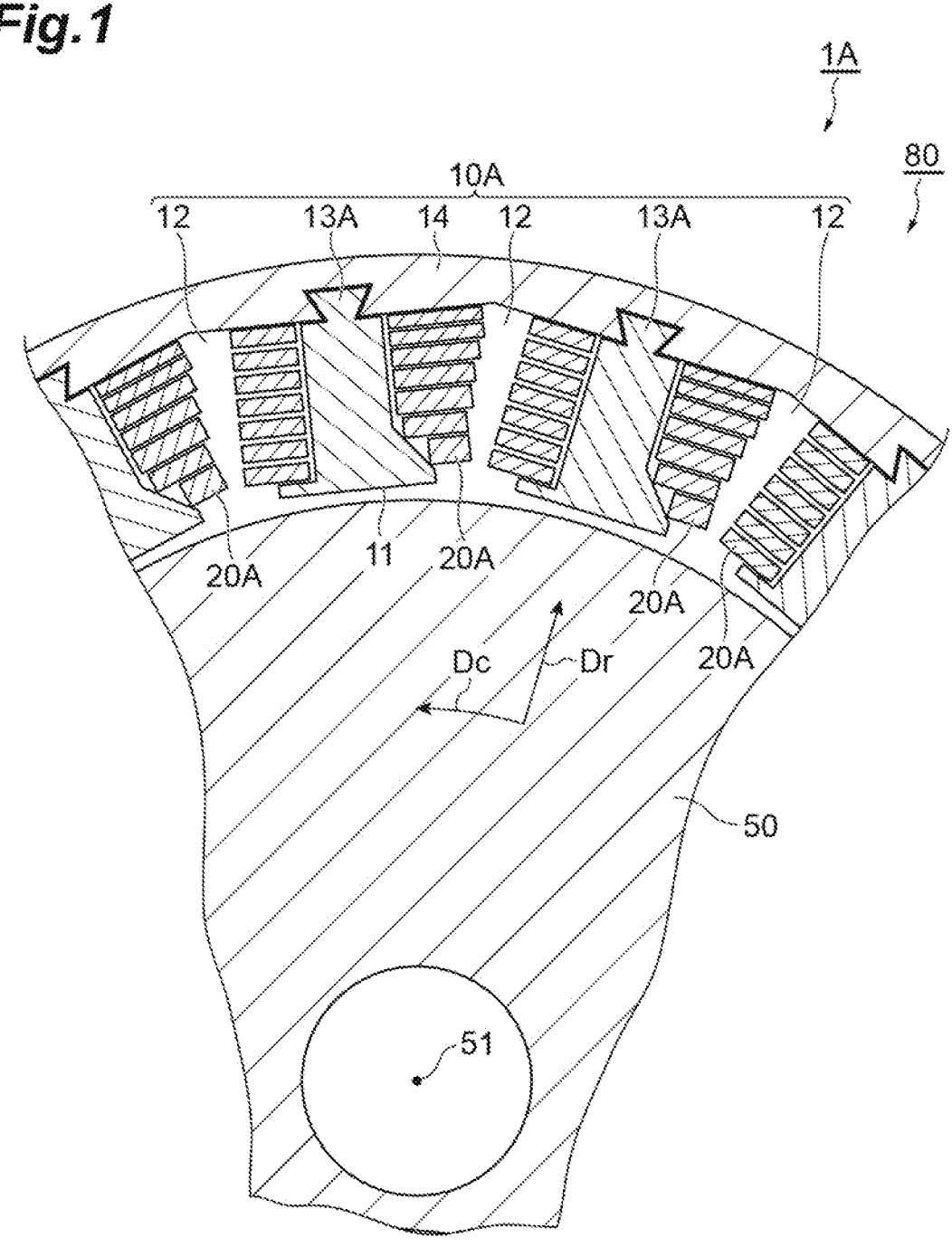
FIG. 1 is a cross-sectional view taken along a cross section perpendicular to a rotational axis of a rotor of an electric motor including a stator according to a first embodiment.

A stator according to one aspect of the present disclosure includes: a stator core having a plurality of slots opening toward an inner surface and a plurality of teeth formed between the slots adjacent to each other; and flat angle coils wound around the teeth respectively. Each of the teeth includes a widened portion having a width in a circumferential direction of the inner surface, closer to the inner surface and the widened portion becomes wider, in a cross-sectional view taken along a cross section perpendicular to a rotational axis of a rotor surrounded by the stator core.

According to the stator of the present disclosure, the stator includes a stator core having a plurality of slots opening toward an inner surface and a plurality of teeth formed between the slots adjacent to each other; and flat angle coils wound around the teeth respectively. Each of the teeth includes a widened portion having a width in a circumferential direction of the inner surface, closer to the inner surface and the widened portion becomes wider, in a cross-sectional view taken along a cross section perpendicular to a rotational axis of a rotor surrounded by the stator core. Therefore, magnetic flux saturation is less likely to occur, leakage magnetic flux is reduced, and eddy current loss occurring in a flat angle coil can be reduced.

In some aspects, the flat angle coils may be respectively wound around the teeth at a position spaced apart from the inner surface than the widened portion.

According to this configuration, the flat angle coils are respectively wound around the teeth at a position spaced apart from the inner surface than the widened portion. Therefore, the magnetic flux transmitted through the flat angle coil can be reduced, and the eddy current loss generated in the flat angle coil can be further reduced.

In some aspects, the flat angle coil may include a narrowed portion having a width in a circumferential direction of the inner surface, closer to the inner surface and the narrowed portion becomes narrower; the teeth may be divided into two portions, the two portions consisting of an approaching portion and a leaving portion, the approaching portion being on a side of the teeth to which a rotating direction of the rotor approaches and the leaving portion being on another side of the teeth to which the rotating direction of the rotor leaves, in the cross-sectional view taken along the cross section perpendicular to the rotational axis of the rotor surrounded by the stator core; the approaching portion may include the widened portion having the width in the circumferential direction of the inner surface, closer to the inner surface and the widened portion continuously becomes wider; and the narrowed portion may be wound around the approaching portion.

According to this configuration, the flat angle coil includes a narrowed portion having a width in a circumferential direction of the inner surface, closer to the inner surface and the narrowed portion becomes narrower. The teeth are divided into two portions, the two portions consisting of an approaching portion and a leaving portion, the approaching portion being on a side of the teeth to which a rotating direction of the rotor approaches and the leaving portion being on another side of the teeth to which the rotating direction of the rotor leaves, in the cross-sectional view taken along the cross section perpendicular to the rotational axis of the rotor surrounded by the stator core. The approaching portion includes the widened portion having the width in the circumferential direction of the inner surface, closer to the inner surface and the widened portion continuously becomes wider. The narrowed portion is wound around the approaching portion. Therefore, magnetic flux saturation is less likely to occur in the approaching portion where magnetic flux is likely to be saturated, leakage magnetic flux can be further reduced, and eddy current loss occurring in the flat angle coil can be further reduced.

In some aspects, the leaving portion may include the widened portion having the width in the circumferential direction of the inner surface, closer to the inner surface and the widened portion continuously becomes wider, and narrowed portion may be wound around the approaching portion and the leaving portion.

According to this configuration, in addition to the approaching portion, the leaving portion also includes the widened portion having the width in the circumferential direction of the inner surface, closer to the inner surface and the widened portion continuously becomes wider. The narrowed portion is wound around both the approaching portion and the leaving portion. Therefore, magnetic flux saturation is less likely to occur in both the approaching portion and the leaving portion, leakage magnetic flux can be further reduced, and eddy current loss occurring in the flat angle coil can be further reduced.

In some aspects, a thickness of the narrowed portion may become thicker in a radial direction of the inner surface as the narrowed portion becomes narrower in the circumferential direction of the inner surface.

According to this configuration, a thickness of the narrowed portion becomes thicker in a radial direction of the inner surface as the narrowed portion becomes narrower in the circumferential direction of the inner surface. Therefore, it is possible to reduce the variation in resistance value of each portion of the flat angle coil by reducing variation in the cross-sectional area of the flat angle coil.

In some aspects, a product of a width of the flat angle coils in the circumferential direction of the inner surface and a thickness of the flat angle coils in the radial direction may be constant.

According to this configuration, a product of a width of the flat angle coils in the circumferential direction of the inner surface and a thickness of the flat angle coils in the radial direction is constant. Therefore, resistance value of each part of the flat angle coil can be made the same by making the cross-sectional area of the flat angle coil constant.

In some aspects, the stator may further include a cooling pipe provided adjacent to the widened portion.

According to this configuration, the stator further includes a cooling pipe provided adjacent to the widened portion. Therefore, it is possible to further reduce the eddy current loss generated in the flat angle coil while suppressing an increase in the physical size of the electric motor, by effectively utilizing the space around the widened portion of the teeth.

Hereinafter, embodiments of the present disclosure will be described with reference to the drawings. As shown in FIG. 1, an electric motor 80 including a stator 1A according to a first embodiment of the present disclosure includes a rotor 50 that rotates around a rotational axis 51 in a state of being surrounded by the stator 1A. The electric motor 80 are applied, for example, in the field of aerospace. The electric motor 80 is applied to, for example, power of a fuel pump. The electric motor 80 may be a DC electric motor or an AC electric motor. When the electric motor 80 is a direct current electric motor, the electric motor 80 may be, for example, an electromagnetic field type commutator electric motor. When the electric motor 80 is an alternating-current electric motor, the electric motor 80 may be, for example, a synchronous motor and an alternating-current commutator electric motor.

The stator 1A includes a stator core 10A and a flat angle coil 20A. The stator core 10A includes a plurality of a slot 12 opening to an inner surface 11 of the stator 1A and a plurality of a teeth 13A formed between the slot 12 adjacent to each other. Each of the teeth 13A is fixed to a back yoke 14. In the present embodiment, the stator core 10A is a divided core in consideration of manufacturability. The outside of the back yoke 14 is surrounded by a case (not shown).

The flat angle coil 20A is wound around each of the teeth 13A. The flat angle coil 20A is a winding having a quadrilateral shape in a cross-sectional view perpendicular to the winding direction of the flat angle coil 20A. In the following description and drawings, a circumferential direction Dc of the inner surface 11 and a radial direction Dr of the inner surface 11 will be described as references.

Figure 2:
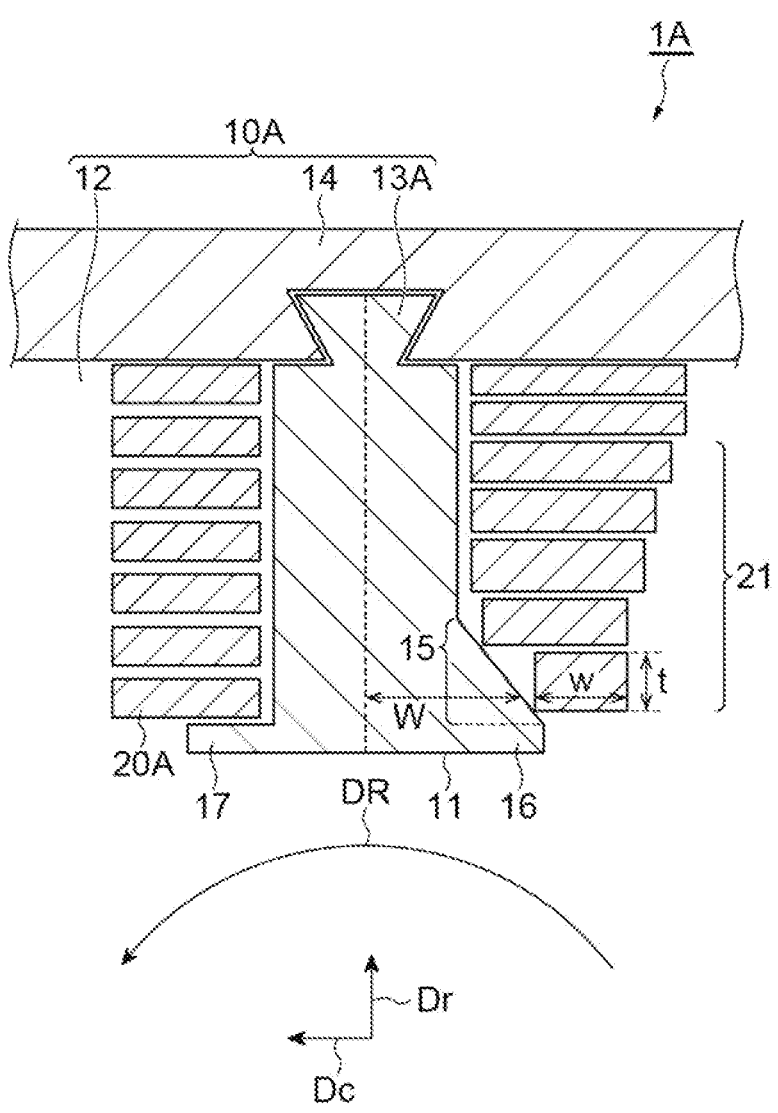
FIG. 2 is a cross-sectional view taken along a cross section perpendicular to the rotational axis of the rotor in the vicinity of one tooth and a flat angle coil wound around one tooth of the stator according to the first embodiment.

As illustrated in FIG. 2, in a cross-sectional view taken along a cross section perpendicular to the rotational axis 51 of the rotor 50 surrounded by the stator core 10A, the teeth 13A includes a widened portion 15 having a width W in a circumferential direction Dc of the inner surface 11, closer to the inner surface 11 and the widened portion 15 becomes wider. On the other hand, the flat angle coil 20A includes a narrowed portion 21 having a width w in a circumferential direction Dc of the inner surface 11, closer to the inner surface 11 and the narrowed portion 21 becomes narrower.

In a cross-sectional view taken along a cross section perpendicular to the rotational axis 51 of the rotor 50 surrounded by the stator core 10A, the teeth 13A can be divided into two portions. The two portions consist of an approaching portion 16 and a leaving portion 17. The approaching portion 16 is on a side of the teeth 13A to which a rotating direction of the rotor 50 approaches, and the leaving portion 17 is on another side of the teeth 13A to which the rotating direction of the rotor 50 leaves, in the cross-sectional view taken along the cross section perpendicular to the rotational axis 51 of the rotor 50 surrounded by the stator core 10A. The side of the teeth 13A to which a rotating direction of the rotor 50 approaches is the side of the rotor 50 opposite to a rotating direction DR. The other side of the teeth 13A to which the rotating direction of the rotor 50 leaves is the rotating direction DR side of the rotor 50. "Be divided into two portions" means dividing into two parts by a plane including the rotational axis 51 of the rotor 50, for example. "Be divided into two portions" may mean that the teeth 13A can be assumed to be two divided parts of the approaching portion 16 and the leaving portion 17. The teeth 13A does not need to be constituted by separate members of the two divided the approaching portion 16 and the leaving portion 17.

The approaching portion 16 of the teeth 13A includes the widened portion 15 in which the width W of the circumferential direction Dc of the inner surface 11 continuously increases as approaching the inner surface 11.

The approaching portion 16 of the teeth 13A includes the widened portion 15 having the width W in the circumferential direction Dc of the inner surface 11, closer to the inner surface 11 and the widened portion 15 continuously becomes wider. "The widened portion 15 continuously becomes wider" means that, for example, in a cross-sectional view of a cross section perpendicular to the rotational axis 51 of the rotor 50, a surface of the widened portion 15 facing the slot 12 is not indicated by a line parallel to the radial direction Dr and a line perpendicular to the radial direction Dr. On the other hand, in the leaving portion 17 of the teeth 13A, the width W of the circumferential direction Dc of the inner surface 11 is constant regardless of the distances from the inner surface 11. The narrowed portion 21 of the flat angle coil 20A is wound around the approaching portion 16. On the other hand, in the leaving portion 17, the width w of the circumferential direction Dc of the inner surface 11 is constant in any winding. The teeth 13A and the flat angle coil 20A are asymmetric in a cross-sectional view taken along a cross section perpendicular to the rotational axis 51 of the rotor 50.

A thickness t of the narrowed portion 21 becomes thicker in a radial direction Dr of the inner surface 11 as the narrowed portion 21 becomes narrower in the circumferential direction Dc of the inner surface 11. A product of a width w of the flat angle coils 20A in the circumferential direction Dc of the inner surface 11 and the thickness t of the flat angle coils 20A in the radial direction Dr is constant. In other words, in the flat angle coil 20A, the cross section of the flat angle coil 20A perpendicular to the winding direction is constant.

When manufacturing the flat angle coil 20A in which the width w and the thicknesses t vary in each portion of such the flat angle coil 20A and the product of the width w and the thicknesses t is constant, for example, one plate material having desired the width w and thicknesses t is formed for each winding. These plates are stacked in the direction of thickness t and joined together. Portions of the plates other than the portions joined to each other are insulated from each other. In this manner, the flat angle coil 20A of the present embodiment can be manufactured. After the flat angle coil 20A is assembled to the teeth 13A, the teeth 13A is fixed to the back yoke 14.

In the present embodiment, the widened portion 15 is formed in one portion of the approaching portion 16 of the teeth 13A near the inner surface 11. In the present embodiment, the narrowed portion 21 is wound around one portion of the approaching portion 16 of the teeth 13A near the inner surface 11. In the present embodiment, in a cross-sectional view taken along a cross section perpendicular to the rotational axis 51 of the rotor 50, a surface of the widened portion 15 on the slot 12 side is indicated by a straight line.

The widened portion 15 may be formed in an entire portion in which the approaching portion 16 of the teeth 13A extends from the back yoke 14 toward the inner surface 11. In the narrowed portion 21, the approaching portion 16 of the teeth 13A may be wound around the entire portion extending from the back yoke 14 toward the inner surface 11. In a cross-sectional view taken along a cross section perpendicular to the rotational axis 51 of the rotor 50, the surface of the widened portion 15 on the slot 12 side may be indicated by a curved line instead of a straight line.

The slot 12 near the approaching portion 16 of the teeth 13A is a semi-open slot type. The semi-open slot type is a slot in which the width of the circumferential direction Dc of the opening portion of the slot 12 that opens to the inner surface 11 is narrower than the width of the circumferential direction Dc of the portion to which the flat angle coil 20A is attached. On the other hand, the slot 12 near the leaving portion 17 of the teeth 13A is a conventional semi-open slot type or a conventional open slot type. The open slot type is a slot in which the width of the circumferential direction Dc of the opening of the slot 12 that opens to the inner surface 11 is equal to or greater than the width of the circumferential direction Dc of the portion to which the flat angle coil 20A is attached.

In the present embodiment, the stator 1A includes the stator core 10A having a plurality of slots 12 opening toward an inner surface 11 and a plurality of teeth 13A formed between the slots 12 adjacent to each other, and flat angle coils 20A wound around the teeth 13A respectively. In the stator 1A, each of the teeth 13A includes the widened portion 15 having the width W in the circumferential direction Dc of the inner surface 11, closer to the inner surface 11 and the widened portion 15 becomes wider, in a cross-sectional view taken along a cross section perpendicular to the rotational axis 51 of the rotor 50 surrounded by the stator core 10A. Therefore, magnetic flux saturation is less likely to occur. The leakage flux is reduced. The eddy current loss generated in the flat angle coil 20A can be reduced.

In the present embodiment, the flat angle coils 20A include the narrowed portion 21 having the width w in the circumferential direction Dc of the inner surface 11, closer to the inner surface 11 and the narrowed portion 21 becomes narrower. The teeth 13A are divided into two portions, the two portions consisting of the approaching portion 16 and the leaving portion 17. The approaching portion 16 is provided on a side of the teeth 13A to which the rotating direction of the rotor 50 approaches, and the leaving portion 17 is provided on another side of the teeth 13A to which the rotating direction of the rotor 50 leaves, in the cross-sectional view taken along the cross section perpendicular to the rotational axis 51 of the rotor 50 surrounded by the stator core 10A. The approaching portion 16 includes the widened portion 15 having the width W in the circumferential direction Dc of the inner surface 11, closer to the inner surface 11 and the widened portion 15 continuously becomes wider. The narrowed portion 21 is wound around the approaching portion 16. Therefore, the saturation of the magnetic fluxes is less likely to occur in the approaching portion 16 where the magnetic fluxes are likely to be saturated. The leakage flux is further reduced. The eddy current loss generated in the flat angle coil 20A can be further reduced.

In the present embodiment, in the narrowed portion 21, the thickness t of the narrowed portion 21 becomes thicker in the radial direction Dr of the inner surface 11 as the narrowed portion 21 becomes narrower in the circumferential direction Dc of the inner surface 11. Therefore, the variation in the cross-section of the flat angle coil 20A is reduced. As a result, it is possible to reduce variations in the resistance value of each portion of the flat angle coil 20A. In this embodiment, the product of the width w of the flat angle coil 20A in the circumferential direction Dc of the inner surface 11 and the thickness t of the flat angle coil 20A in the radial direction Dr is constant. Therefore, by making the cross-sectional areas of the flat angle coil 20A constant, the resistance values of the respective portions of the flat angle coil 20A can be made equal.

Figure 3:
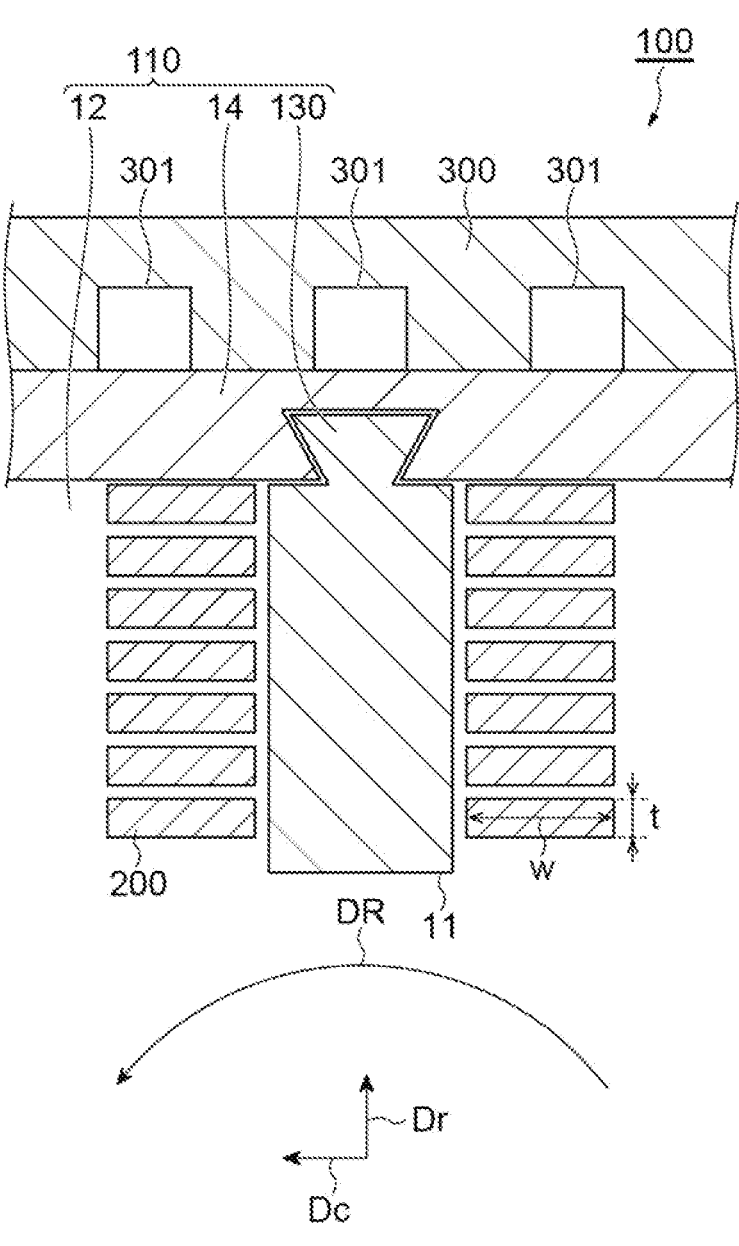
FIG. 3 is a cross-sectional view taken along a plane perpendicular to the rotational axis of the rotor in the vicinity of one tooth and a flat angle coil wound around one tooth of a conventional stator.

That is, as shown in FIG. 3, in a conventional open slot type a stator 100 in which each of teeth 130 includes a stator core 110 that does not include the widened portion 15 and a flat angle coil 200 that does not include the narrowed portion 21, the flat angle coil 200 has a large surface. Therefore, when the magnetic fluxes from the permanent magnets or the like reach the flat angle coil 200 when the rotor 50 rotates, eddy currents are generated. Therefore, loss of the eddy current increases, and the energy efficiency of the electric motor 80 may decrease.

In order to reduce the eddy current loss, it is conceivable to use a stator core of a semi-open slot type. By using the tip portion of the teeth 130 as a magnetic path, magnetic fluxes reaching the flat angle coil 200 are reduced. However, when the tip portion of the teeth 130 is saturated with magnetic fluxes, leakage magnetic fluxes are generated. When such magnetic fluxes reach the flat angle coil 200, eddy current loss occurs. In the teeth 130 of a general semi-open slot type divided core as shown in FIG. 3, magnetic fluxes are likely to be saturated at a tip portion of the teeth 130 on a side of the teeth 130 to which a rotating direction of the rotor 50 approaches. The occurrence of leakage flux due to flux saturation causes eddy current loss occurring in the flat angle coil 200.

Therefore, as shown in FIG. 2, in the present embodiment, the teeth 13A having an asymmetric shape in a cross-sectional view taken along a cross section perpendicular to the rotational axis 51 of the rotor 50 is adopted to suppress magnetic saturation. The approaching portion 16 provided on the side of the teeth 13A to which the rotating direction of the rotor 50 approaches includes the widened portion 15 in which the width W of the circumferential direction Dc of the inner surface 11 continuously increases toward the inner surface 11, and the radial direction Dr is thick. Thus, the leakage flux is suppressed, and the eddy current loss generated in the flat angle coil 20A is reduced.

Due to such a shape of the teeth 13A, the space factor of the flat angle coil 20A may be caused to be reduced. However, in this embodiment, in the narrowed portion 21 of the flat angle coil 20A, the thicknesses t and the width w of the flat angle coil 20A vary for each winding, and thus it is possible to reduce the eddy current loss generated in the flat angle coil 20A without reducing the space factor. In the leaving portion 17 provided on the other side of the teeth 13A to which the rotating direction of the rotor 50 leaves, flux saturation is less likely to occur than in the approaching portion 16. In the leaving portion 17, the width w and the thicknesses t are constant in any winding of the flat angle coil 20A. As described above, in the present embodiment, the flat angle coil 20A having an asymmetric shape in a cross-sectional view taken along a cross-section perpendicular to the rotational axis 51 of the rotor 50 is adopted, thereby improving the space factor and reducing the copper loss.

Figure 4:
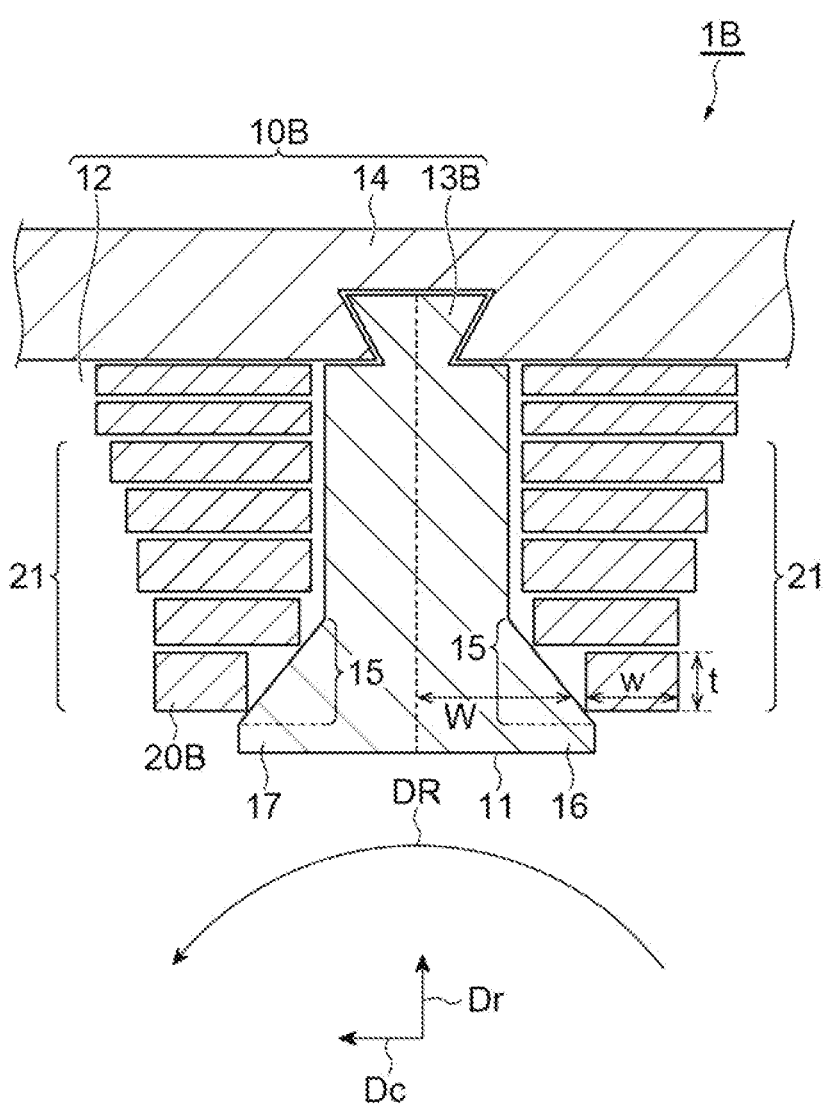
FIG. 4 is a cross-sectional view taken along a cross section perpendicular to the rotational axis of the rotor in the vicinity of one tooth and a flat angle coil wound around one tooth of the stator according to the second embodiment.

Hereinafter, a second embodiment of the present disclosure will be described. As illustrated in FIG. 4, in a stator 1B of the present embodiment, both the approaching portion 16 and the leaving portion 17 of a teeth 13B of a stator core 10B include the widened portion 15 having the width in the circumferential direction Dc of the inner surface 11, closer to the inner surface 11 and the widened portion 15 continuously becomes wider. The narrowed portion 21 of a flat angle coil 20B are wound on both the approaching portion 16 and the leaving portion 17. The teeth 13B and the flat angle coil 20B are symmetrical in a cross-sectional view of a cross section perpendicular to the rotational axis 51 of the rotor 50.

In the present embodiment, the widened portion 15 is formed in one portion on the side of the approaching portion 16 of the teeth 13B and the inner surface 11 of the leaving portion 17. In the present embodiment, the narrowed portion 21 is wound around one portion on the side of the approaching portion 16 of the teeth 13B and the inner surface 11 of the leaving portion 17. In the present embodiment, in a cross-sectional view taken along a cross section perpendicular to the rotational axis 51 of the rotor 50, a surface of the widened portion 15 facing the slot 12 is indicated by a straight line.

The widened portion 15 may be formed in an entire portion in which the approaching portion 16 and the leaving portion 17 of the teeth 13B extend from the back yoke 14 toward the inner surface 11. In the narrowed portion 21, the approaching portion 16 of the teeth 13B may be wound around the entire portion extending from the back yoke 14 toward the inner surface 11. In a cross-sectional view taken along a cross section perpendicular to the rotational axis 51 of the rotor 50, the surface of the widened portion 15 on the slot 12 side may be indicated by a curved line instead of a straight line. In the present embodiment, both the approaching portion 16 and the leaving portion 17 may include the widened portion 15, the narrowed portion 21 may be wound around both the approaching portion 16 and the leaving portion 17, and the teeth 13B and the flat angle coil 20B may be asymmetric in a cross-sectional view taken along a cross section perpendicular to the rotational axis 51 of the rotor 50. Other points are the same as those in the first embodiment.

According to the present embodiment, in the teeth 13B of the stator core 10B, the leaving portion 17 also include the widened portion 15 having the width in the circumferential direction Dc of the inner surface 11 in addition to the approaching portion 16, closer to the inner surface 11 and the widened portion 15 continuously becomes wider. The narrowed portion 21 of the flat angle coil 20B is wound around both the approaching portion 16 and the leaving portion 17. For this reason, it is possible to make it difficult for flux saturation to occur in both the approaching portion 16 and the leaving portion 17, to further reduce leakage flux, and to further reduce eddy current loss occurring in the flat angle coil 20B.

Figure 5:
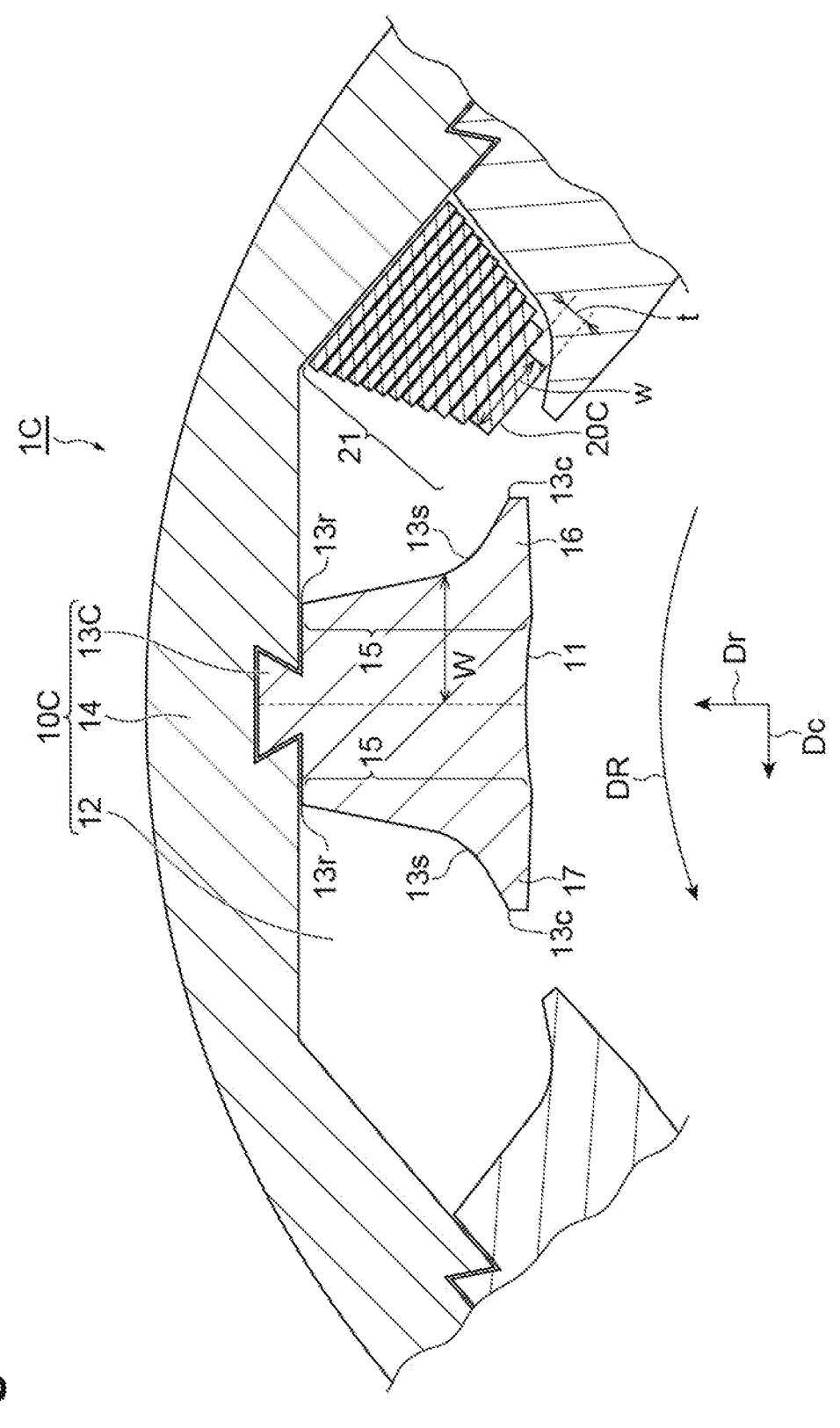
FIG. 5 is a cross-sectional view taken along a plane perpendicular to the rotational axis of the rotor of the electric motor including the stator according to the third embodiment.

Hereinafter, a third embodiment of the present disclosure will be described. As illustrated in FIG. 5, similarly to the second embodiment, in a stator 1C of the present embodiment, both the approaching portion 16 and the leaving portion 17 of a teeth 13C of a stator core 10C include the widened portion 15 having the width W in the circumferential direction Dc of the inner surface 11, closer to the inner surface 11 and the widened portion 15 continuously becomes wider. Both the approaching portion 16 and the leaving portion 17 of the teeth 13C of the stator core 10C have streamlined portions 13s, bases 13r, and bent portions 13c on the surfaces facing the slot 12.

Figure 6:
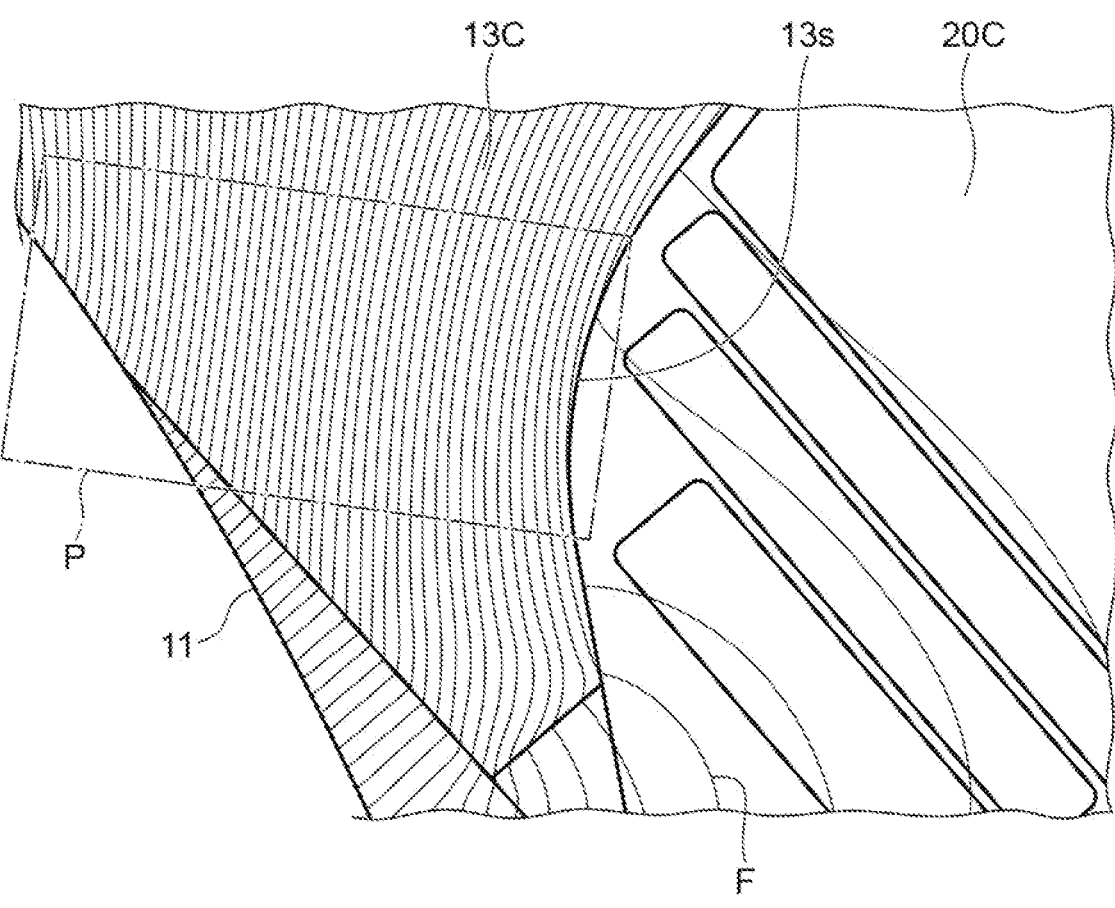
FIG. 6 is a cross-sectional view taken along a cross-section perpendicular to the rotational axis of the rotor, showing magnetic fluxes in the vicinity of one tooth and a flat angle coil wound around one tooth of the stator according to the third embodiment.

As shown in FIG. 6, the streamlined portion 13s on the surface of the widened portion 15 facing the slot 12 has a streamlined shape along a magnetic flux lines F. As indicated by the magnetic flux lines F and a portion P having a uniform flux density in FIG. 6, in the case of the semi-open slot, the flux density of the flux passing through the tip of the teeth 13C increases as it approaches the inner surface 11, so that the flux saturation occurs. In the first embodiment and the second embodiment described above, the widened portion 15 is provided in order to alleviate the saturation of magnetic fluxes. However, as described above, in a cross-sectional view taken along a cross section perpendicular to the rotational axis 51 of the rotor 50, the areas into which the flat angle coil 20A and the 20B can be inserted may be caused to be reduced by the widened portion 15, the physical size of the electric motor 80 may be caused to be increased, and the energy density may be caused to be reduced.

In order to minimize the reduction of a flat angle coil 20C insertable area in the cross-sectional view perpendicular to the rotational axis 51 of the rotor 50, in the present embodiment, as shown in FIG. 6, the streamlined portion 13s on the surface facing the slot 12 of the widened portion 15 has a streamlined shape along the magnetic flux lines F. In FIG. 6, hatching of the teeth 13C and the flat angle coil 20C is omitted for convenience of explanation.

In the present embodiment, the flat angle coil 20C includes the narrowed portion 21 having the width w in the circumferential direction Dc of the inner surface 11, closer to the inner surface 11 and the narrowed portion 21 becomes narrower. Although the flat angle coil 20C of the approaching portion 16 is not shown in FIG. 5, the narrowed portion 21 of the flat angle coil 20C is wound around both the approaching portion 16 and the leaving portion 17. The teeth 13C and the flat angle coil 20C are symmetrical in a cross-sectional view of a cross section perpendicular to the rotational axis 51 of the rotor 50.

The surface of the teeth 13C facing the slot 12 has the base 13r with which the inner surface of the back yoke 14 is in contact. In a cross-sectional view taken along a cross section perpendicular to the rotational axis 51 of the rotor 50, in the base 13r, a surface facing the slot 12 of the teeth 13C and an inner surface of the back yoke 14 form an acute angle.

Figure 7:
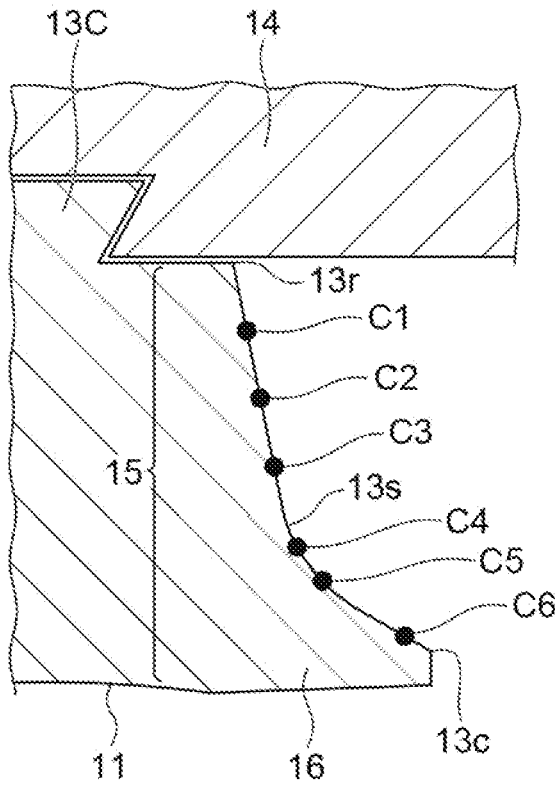
FIG. 7 is a cross-sectional view taken along a cross section perpendicular to the rotational axis of the rotor near one tooth of the stator according to the third embodiment.
Figure 8:
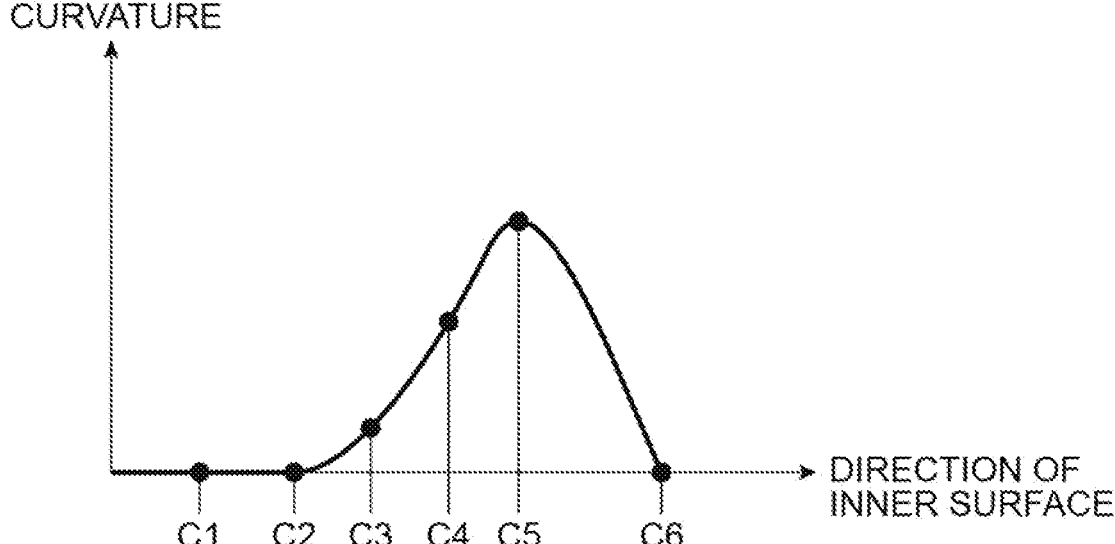
FIG. 8 is a graph showing the curvature at each point on a surface of the teeth facing the slot shown in FIG. 7.

As shown in FIG. 7, a plurality of points C1, C2, C3, C4, C5, and C6 are assumed on the surface facing the slot 12. As shown in FIG. 8, in the widened portion 15 of the teeth 13C, the curvatures have local maximum values in a point C5. The point C5 having the local maximum value is located closer to the inner surface 11 than the middle between the base 13r and the inner surface 11. In the curve of the widened portion 15 from the C1 to the C6, the center of curvature is located outside the teeth 13C in a cross-sectional view taken along a cross section perpendicular to the rotational axis of the teeth 13C. As shown in FIGS. 5 and 7, the teeth 13C has the bent portion 13c that is bent toward the inner surface 11 in the vicinity of the inner surface 11 on a surface facing the slot 12.

Other points are the same as those in the second embodiment. In this embodiment, as in the first embodiment, only the approaching portion 16 of the teeth 13C may have a shape having the streamlined portion 13s, the base 13r, and the bent portion 13c on the surface facing the slot 12.

According to the present embodiment, the teeth 13C and the flat angle coil 20C have shapes derived from analysis of magnetic fluxes. Therefore, in a cross-sectional view taken along a cross section perpendicular to the rotational axis 51 of the rotor 50, the areas of the widened portion 15 can be minimized and the energy densities can be increased most effectively. Although the teeth 13C of the present embodiment has a streamlined shape along the magnetic flux lines F, the energy density can be increased as long as the teeth 13C has a feature similar to the feature of the streamlined shape even if it does not match the streamlined shape.

Figure 9:
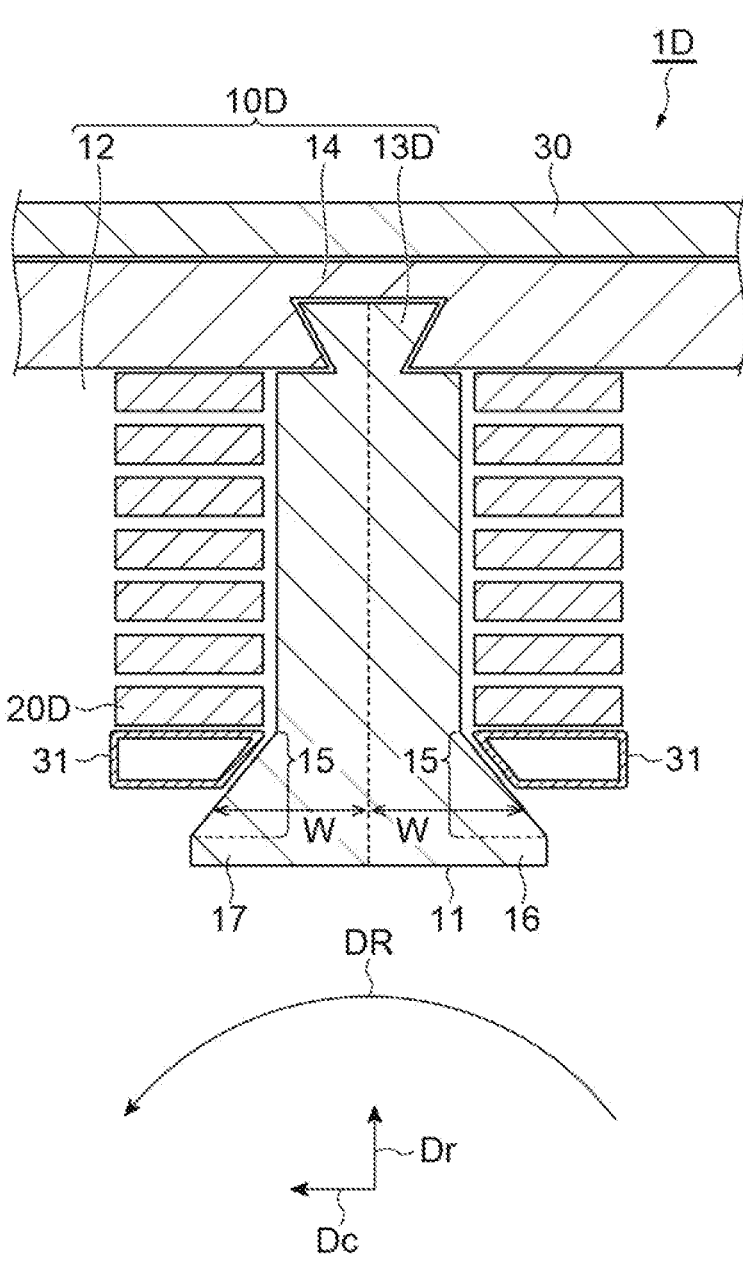
FIG. 9 is a cross-sectional view taken along a cross section perpendicular to the rotational axis of the rotor in the vicinity of one tooth and a flat angle coil wound around one tooth of the stator according to the fourth embodiment.

Hereinafter, a fourth embodiment of the present disclosure will be described. As illustrated in FIG. 9, in a stator 1D according to the present embodiment, both the approaching portion 16 and the leaving portion 17 of a teeth 13D of a stator core 10D include the widened portion 15 having the width in the circumferential direction Dc of the inner surface 11, closer to the inner surface 11 and the widened portion 15 continuously becomes wider. A flat angle coils 20D are respectively wound around the teeth 13D at a position spaced apart from the inner surface 11 than the widened portion 15. The flat angle coil 20D do not have the narrowed portion 21. The width w and thicknesses t are constant for any winding of the flat angle coil 20D. The stator 1D includes a cooling pipe 31 adjacent to the widened portion 15. The cooling pipe 31 is made of, for example, plastic. On the other hand, a case 30 surrounding the stator core 10D is not provided with a cooling pipe. Other points are the same as those in the second embodiment.

According to this embodiment, the flat angle coils 20D are respectively wound around the teeth 13D at a position spaced apart from the inner surface 11 than the widened portion 15. Therefore, the magnetic fluxes transmitted through the flat angle coil 20D can be reduced, and the eddy current loss generated in the flat angle coil 20D can be further reduced. According to the present embodiment, the cooling pipe 31 adjacent to the widened portion 15 is further provided. Therefore, by effectively utilizing the space around the widened portion 15 of the teeth 13D, it is possible to further reduce the eddy current loss generated in the flat angle coil 20D while suppressing an increase in the size of the electric motor 80.

As shown in FIG. 3, in a conventional the stator 100, a cooling pipe 301 is provided in the case 300 surrounding the stator 100. As described above, in the teeth 130, the magnetic fluxes are likely to be saturated at the tip portion of the teeth 130, and the generation of the leakage magnetic fluxes due to the magnetic fluxes' saturation becomes a factor of the eddy current loss generated in the flat angle coil 200. Therefore, in the present embodiment, the approaching portion 16 and the leaving portion 17 include the widened portion 15, and the radial direction Dr is thicker. Thus, the leakage flux is suppressed, and the eddy current loss generated in the flat angle coil 20D is reduced. Further, the flat angle coil 20D is wound around each of the teeth 13D at a position more distant from the inner surface 11 than the widened portion 15. Therefore, the magnetic fluxes transmitted through the flat angle coil 20D are reduced, and the eddy current loss generated in the flat angle coil 20D is further reduced.

Due to such a shape of the teeth 13D, the space factor of the flat angle coil 20D may be reduced. However, in this embodiment, the resin-made the cooling pipe 31 is disposed in the dead space in the vicinity of the widened portion 15 of the slot 12, the space is effectively utilized, and the cooling pipe of the case 30 is abolished. Thus, it is possible to further reduce the eddy current loss generated in the flat angle coil 20D while suppressing an increase in the size of the electric motor 80.

Although the embodiments and modifications of the present disclosure have been described above, the present disclosure is not limited to the above-described embodiments.

INDUSTRIAL APPLICABILITY

According to the stator of the present disclosure, an eddy current loss generated in a flat angle coil can be reduced.

REFERENCE SIGNS LIST 1A, 1B, 1C, 1D: stator, 10A, 10B, 10C, 10D: stator core, 11: inner surface, 12: slot, 13A, 13B, 13C, 13D: teeth, 13s: streamlined portion, 13r: base, 13c: bent portion, 14: back yoke, 15: widened portion, 16: approaching portion, 17: leaving portion, 20A, 20B, 20C, 20D: flat angle coil, 21: narrowed portion, 30: case, 31: cooling pipe, 50: rotor, 51: rotational axis, 80: electric motor, 100: stator, 110: stator core, 130: teeth, 200: flat angle coil, 300: case, 301: cooling pipe, Dc: circumferential direction, Dr: radial direction, DR: rotating direction, W: width, w: width, t: thickness, F: magnetic flux lines, P: portion, C1, C2, C3, C4, C5, C6: point.

The invention claimed is:

1. A stator comprising:

a stator core having a plurality of slots opening toward an inner surface and a plurality of teeth formed between the slots adjacent to each other; and flat angle coils wound around the teeth respectively, wherein each of the teeth includes a widened portion having a width in a circumferential direction of the inner surface, closer to the inner surface and the widened portion becomes wider, in a cross-sectional view taken along a cross section perpendicular to a rotational axis of a rotor surrounded by the stator core, the flat angle coils are wound around the widened portion of the teeth, the flat angle coils are not wound around a portion connecting the widened portion and the inner surface, the flat angle coils include a narrowed portion having a width in a circumferential direction of the inner surface, closer to the inner surface and the narrowed portion becomes narrower, and the widened portion becomes wider such that an inclination degree of a teeth-side cross-sectional shape of the narrowed portion of the flat angle coils wound around the widened portion is greater than an inclination degree of a teeth-opposite-side cross-sectional shape of the narrowed portion of the flat angle coils wound around the teeth at a position spaced apart from the inner surface than the widened portion.

2. The stator according to claim 1, further comprising:

a cooling pipe provided adjacent to the widened portion.

3. The stator according to claim 1, wherein the teeth are divided into two portions, the two portions consisting of an approaching portion and a leaving portion, the approaching portion being on a side of the teeth to which a rotating direction of the rotor approaches and the leaving portion being on another side of the teeth to which the rotating direction of the rotor leaves, in the cross-sectional view taken along the cross section perpendicular to the rotational axis of the rotor surrounded by the stator core, the approaching portion includes the widened portion having the width in the circumferential direction of the inner surface, closer to the inner surface and the widened portion continuously becomes wider, and the narrowed portion is wound around the approaching portion.

4. The stator according to claim 3, wherein the leaving portion includes the widened portion having the width in the circumferential direction of the inner surface, closer to the inner surface and the widened portion continuously becomes wider, and the narrowed portion is wound around the approaching portion and the leaving portion.

5. The stator according to claim 3, wherein a thickness of the narrowed portion becomes thicker in a radial direction of the inner surface as the narrowed portion becomes narrower in the circumferential direction of the inner surface.

6. The stator according to claim 5, wherein a product of a width of the flat angle coils in the circumferential direction of the inner surface and a thickness of the flat angle coils in the radial direction is constant.

* * * * *